United States Patent
Blackmon et al.

(10) Patent No.: US 6,523,080 B1
(45) Date of Patent: Feb. 18, 2003

(54) SHARED BUS NON-SEQUENTIAL DATA ORDERING METHOD AND APPARATUS

(75) Inventors: Herman Lee Blackmon, Rochester, MN (US); Robert Allen Drehmel, Goodhue, MN (US); Lyle Edwin Grosbach, Rochester, MN (US); Kent Harold Haselhorst, Byron, MN (US); David John Krolak, Dodge Center, MN (US); James Anthony Marcella, Rochester, MN (US); Peder James Paulson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/014,090

(22) Filed: Jan. 27, 1998

Related U.S. Application Data

(62) Division of application No. 08/677,775, filed on Jul. 10, 1996, now Pat. No. 5,748,919.

(51) Int. Cl.[7] .............................................. G06F 13/42
(52) U.S. Cl. ........................ 710/305; 710/306; 711/127; 711/147; 711/157
(58) Field of Search .......................... 395/306; 711/127, 711/147, 157; 710/305, 306

(56) References Cited

U.S. PATENT DOCUMENTS

| | | | |
|---|---|---|---|
| 4,490,819 A | 12/1984 | Bogan et al. | ................. 370/84 |
| 4,507,731 A | 3/1985 | Morrison | ..................... 364/200 |
| 4,837,785 A | 6/1989 | McApline | ..................... 370/85 |
| 4,860,198 A | 8/1989 | Takenaka | ..................... 364/200 |
| 4,878,166 A | * 10/1989 | Johnson et al. | |
| 5,113,369 A | 5/1992 | Kinoshita | ..................... 395/325 |
| 5,237,676 A | 8/1993 | Arimilli et al. | ............. 395/550 |
| 5,243,701 A | 9/1993 | Muramatsu et al. | ........ 395/325 |
| 5,255,374 A | 10/1993 | Aldereguia et al. | ......... 395/325 |
| 5,257,391 A | 10/1993 | DuLac et al. | ................ 395/800 |
| 5,280,598 A | 1/1994 | Osaki et al. | ................. 395/425 |
| 5,287,470 A | * 2/1994 | Simpson | |
| 5,293,381 A | 3/1994 | Choy | ........................... 370/99 |

FOREIGN PATENT DOCUMENTS

| | | | |
|---|---|---|---|
| JP | 2114323 | 4/1990 | ............. G06F/5/00 |
| JP | 4-85639 | 3/1992 | ........... G06F/12/04 |
| JP | 4245346 | 9/1992 | ........... G06F/12/06 |
| JP | 5173956 | 7/1993 | ........... G06F/13/38 |

* cited by examiner

Primary Examiner—Rupal Dharia
(74) Attorney, Agent, or Firm—Owen J. Gamon

(57) ABSTRACT

A shared bus non-sequential data ordering method and apparatus are provided. A maximum bus width value and a minimum transfer value are identified. A minimum number of sub-transfers is identified responsive to the identified maximum bus width value and the minimum transfer value. A bus unit having a maximum number of chips to receive and/or send data receives data in a predefined order during multiple sub-transfers. During each data sub-transfer, a corresponding predefined word is transferred to each chip of the bus unit.

6 Claims, 6 Drawing Sheets

| BUS | | | | |
|---|---|---|---|---|
| XFER | CYCLE | | | |
| 1 | 1 | WORD 0 (BYTES 0-3) | WORD 2 (BYTES 8-11) | WORD 4 (BYTES 16-19) | WORD 6 (BYTES 24-27) |
| 1 | 2 | WORD 1 (BYTES 4-7) | WORD 3 (BYTES 12-15) | WORD 5 (BYTES 20-23) | WORD 7 (BYTES 28-31) |
| 2 | 3 | WORD 8 (BYTES 32-35) | WORD A (BYTES 40-43) | WORD C (BYTES 48-51) | WORD E (BYTES 56-59) |
| 2 | 4 | WORD 9 (BYTES 36-39) | WORD B (BYTES 44-47) | WORD D (BYTES 52-55) | WORD F (BYTES 60-63) |
| 3 | 5 | WORD 10 (BYTES 64-67) | WORD 12 (BYTES 72-75) | WORD 14 (BYTES 80-83) | WORD 16 (BYTES 88-91) |
| 3 | 6 | WORD 11 (BYTES 68-71) | WORD 13 (BYTES 76-79) | WORD 15 (BYTES 84-87) | WORD 17 (BYTES 92-95) |
| 4 | 7 | WORD 18 (BYTES 96-99) | WORD 1A (BYTES 104-107) | WORD 1C (BYTES 112-115) | WORD 1E (BYTES 120-123) |
| 4 | 8 | WORD 19 (BYTES 100-103) | WORD 1B (BYTES 108-111) | WORD 1D (BYTES 116-119) | WORD 1F (BYTES 124-127) |

FIG.4

| BUS XFER/CYCLE | | | | | | | | |
|---|---|---|---|---|---|---|---|---|
| 1 | WORD 0 (BYTES 0-3) | WORD 1 (BYTES 4-7) | WORD 2 (BYTES 8-11) | WORD 3 (BYTES 12-15) | WORD 4 (BYTES 16-19) | WORD 5 (BYTES 20-23) | WORD 6 (BYTES 24-27) | WORD 7 (BYTES 28-31) |
| 2 | WORD 8 (BYTES 32-35) | WORD 9 (BYTES 36-39) | WORD A (BYTES 40-43) | WORD B (BYTES 44-47) | WORD C (BYTES 48-51) | WORD D (BYTES 52-55) | WORD E (BYTES 56-59) | WORD F (BYTES 60-63) |
| 3 | WORD 10 (BYTES 64-67) | WORD 11 (BYTES 68-71) | WORD 12 (BYTES 72-75) | WORD 13 (BYTES 76-79) | WORD 14 (BYTES 80-83) | WORD 15 (BYTES 84-87) | WORD 16 (BYTES 88-91) | WORD 17 (BYTES 92-95) |
| 4 | WORD 18 (BYTES 96-99) | WORD 19 (BYTES 100-103) | WORD 1A (BYTES 104-107) | WORD 1B (BYTES 108-111) | WORD 1C (BYTES 112-115) | WORD 1D (BYTES 116-119) | WORD 1E (BYTES 120-123) | WORD 1F (BYTES 124-127) |

FIG.5

SHARED BUS NON-SEQUENTIAL DATA ORDERING METHOD AND APPARATUS

This is a divisional application of parent application Ser. No. 08/677,775 filed on Jul. 10, 1996 now U.S. Pat. No. 5,748,919.

FIELD OF THE INVENTION

The invention relates generally to data processing systems, and more particularly to a shared bus non-sequential data ordering method and apparatus for a data processing system.

BACKGROUND OF THE INVENTION

Data processing or computer systems typically include a shared data path known as a bus. The bus connects bus units such as processors, memories, and storage devices. Data is transferred between bus units via the bus. The speed at which data is transferred on the bus is an important component of the performance of the computer system.

Requirements for increased data transfer speed on the bus are fueled by an increase in the number of instructions that processors can execute and the speed at which the processors can execute instructions. With the advent of integration technologies of well over one million transistors on a chip and increasing, it is now possible to build superscalar and VLIW (very long instruction word) processors. These processors often execute more than one instruction per cycle, which increases the requirements for large amounts of data to be transferred to and from memory or storage. In addition to the increased integration density of processors, processor speeds are increasing faster than memory access times, and even beyond the time of flight for signals on a bus. This speed mismatch also increases the requirement for large amounts of data to be transferred.

To satisfy these growing requirements for large amounts of data, the speed of the bus needs to be increased. The speed at which a shared bus can transfer data is determined in part by the physical length of the bus, the load on the bus, and the minimum transfer amount (also called the bus width or bus size). The physical length of the bus is simply the length of the connection between bus units. The greater the physical length of the bus, the slower the bus will be. The load is the impedance of one wire of the bus as seen by the driver. The greater the load, the slower the bus will be. The load on the bus is determined by the number of bus units on the bus and the load presented by each bus unit. The minimum transfer amount is the amount of data that is transferred across the bus at one time. The larger the minimum transfer amount, the faster the speed of the data transfer will be. To satisfy the requirements of modern processors, the desired minimum transfer size on the bus that the processor or its cache requires is increasing from four or eight bytes to sixteen or thirty-two bytes and beyond.

Unfortunately it is not always possible to merely increase the size of the minimum transfer in order to increase the bus transfer speed because the size of the minimum transfer is limited by physical constraints. These physical constraints include: the number of I/O pins on chips, chip modules, and card connectors; the wiring constraints of chips, cards, and multi chip modules; and the cost of wide buses. As integrated circuits become more dense and provide the capability of more and more data throughput, they are surpassing the ability of modules and cards to provide the data throughput needed. Even if the technology exists to use the I/O capabilities of chips, it can be cost prohibitive, forcing the use of older, more cost effective packaging technologies to be competitive in the marketplace.

Thus, because of the physical and cost constraints, a complex computer system may have many buses of varying sizes. For example, the cache data bus may be wider than the main store data bus. When two buses of different sizes are connected, the transfer size of one bus must be converted to the transfer size of the other bus. To accomplish this, when converting from a larger transfer size to a smaller transfer size, two or more sub-transfers are required to make up the minimum transfer size. Existing conversion methods use sequential data ordering where each byte is in sequential order with its neighbor on the data bus. For example, when converting from a larger transfer size to a smaller transfer size, the first part of the total width is transferred, then the second part, then the third part, and so on, until the conversion is completed. U.S. Pat. No. 5,243,701 is an example of a memory sub-system that has the capability to work on an eight bit or sixteen bit bus using sequential data ordering.

These existing conversion methods have a problem in that they cause increased loading, which lowers performance, when multiple chips interface to the bus. With the need for wide minimum transfers to increase bus speed, often there will be multiple chips interfacing to the bus. Each of these chips would receive a portion of the data transferred, and there will be more than one chip load on the bus. An example of multiple chips connected to the data bus could be four DRAM controller chips each controlling four bytes of DRAMs to provide a minimum transfer size of sixteen bytes. Another example is four cache controller chips that contain the cache for four bytes of data would also provide a minimum transfer size of sixteen bytes.

Advances in integrated circuits and processor design are creating a new set of problems for the designers of shared busses. The very wide minimum data transfer required by these latest processors and their reduced cycle time pushes the shared bus designer to transfer more data in less time than ever before. When the shared bus width is less than the required minimum transfer, the requested data must be transferred in two or more sub-transfers. To keep the bus operating at the cycle time of the processor the designer must also reduce loading on the bus. With the need for the wide minimum transfer, often there will be multiple chips interfacing to the bus. If the designer uses the current art to convert the minimum required transfer size to the actual bus width there will be extra loading on the bus, thereby reducing its speed. The shared bus non-sequential data ordering method and apparatus that follows provides significant improvement over the prior art in balancing the needs and constraints of the system.

SUMMARY OF THE INVENTION

It is a principal object of the present invention to provide a shared bus non-sequential data ordering method and apparatus that overcomes many of the disadvantages of prior art arrangements by enabling reduced bus loading and improved performance of the bus The objects and advantages of the present invention are achieved by a shared bus non-sequential data ordering method and apparatus. First, a maximum bus width value and a minimum transfer value are identified. Second, a minimum number of sub-transfers is identified responsive to the identified maximum bus width value and the minimum transfer value. Third, a bus unit having a maximum number of chips to receive and/or send data is identified. Finally, during each data sub-transfer, a corresponding predefined word is transferred to or from each of the chips of the bus unit identified with the maximum number of chips on the bus.

BRIEF DESCRIPTION OF THE DRAWING

The present invention, together with the above and other objects and advantages, can best be understood from the following detailed description of the embodiment of the invention illustrated in the drawing, wherein:

FIG. 4 is a diagram illustrating byte numbering and ordering for a 16 byte main store bus;

FIG. 5 is a diagram illustrating byte numbering and ordering for a 32 byte main store bus.

DETAILED DESCRIPTION OF THE PREFERRED EMBODIMENTS

Figure 1:
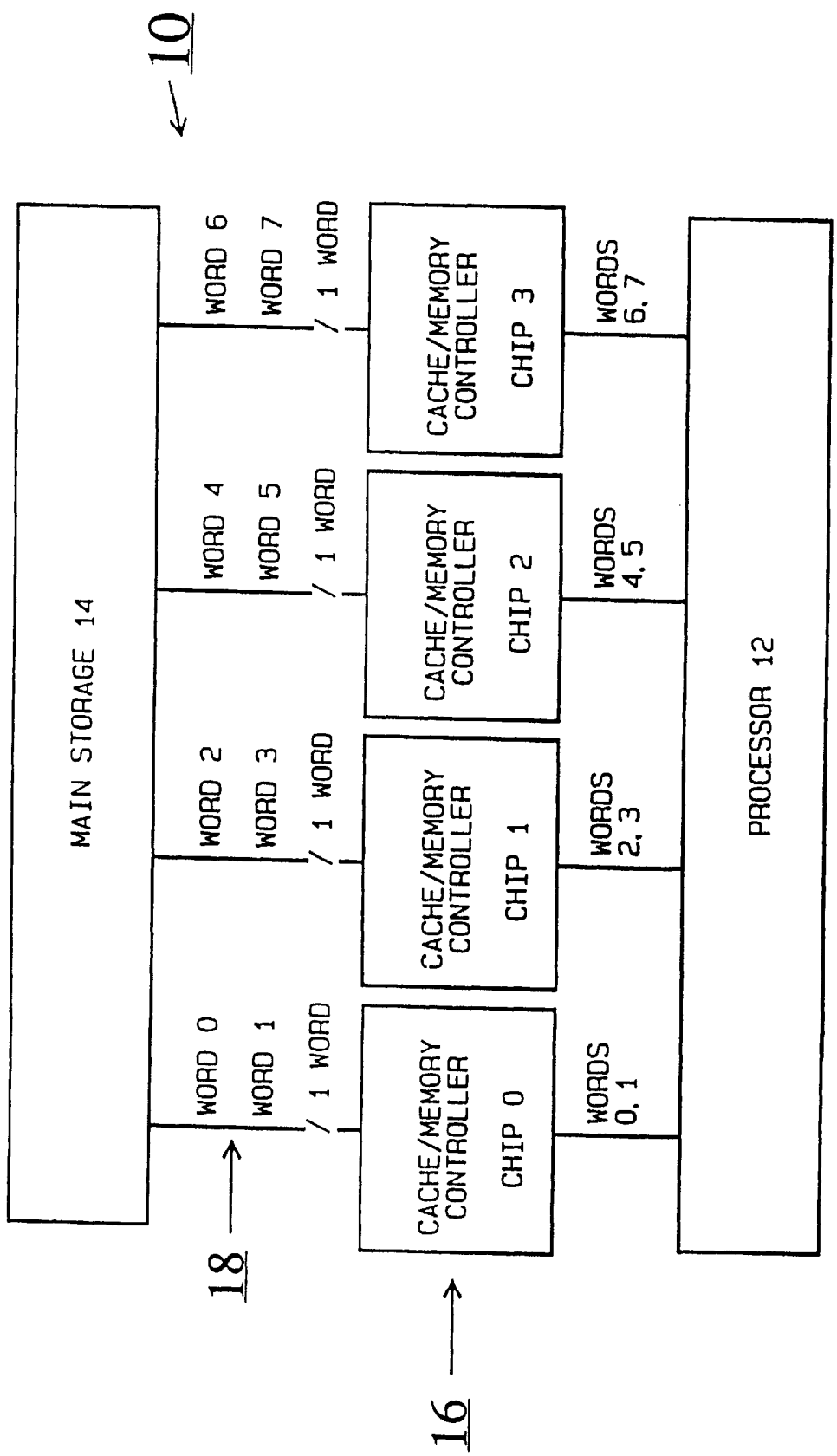
FIG. 1 is a block diagram representation of a computer or data processing system embodying the present invention.

Referring now to FIG. 1 of the drawing, there is shown a computer or data processing system generally designated by the reference character 10 and embodying the present invention. Computer system 10 includes a processor 12, a memory or main storage 14 used with a main storage controller unit (MSCU) 16 that includes a plurality of cache/memory controller chips CHIP 0, CHIP 1, CHIP 2 and CHIP 3 with a shared main store bi-directional bus with non-sequential data ordering generally designated by the reference character 18.

Figure 6:
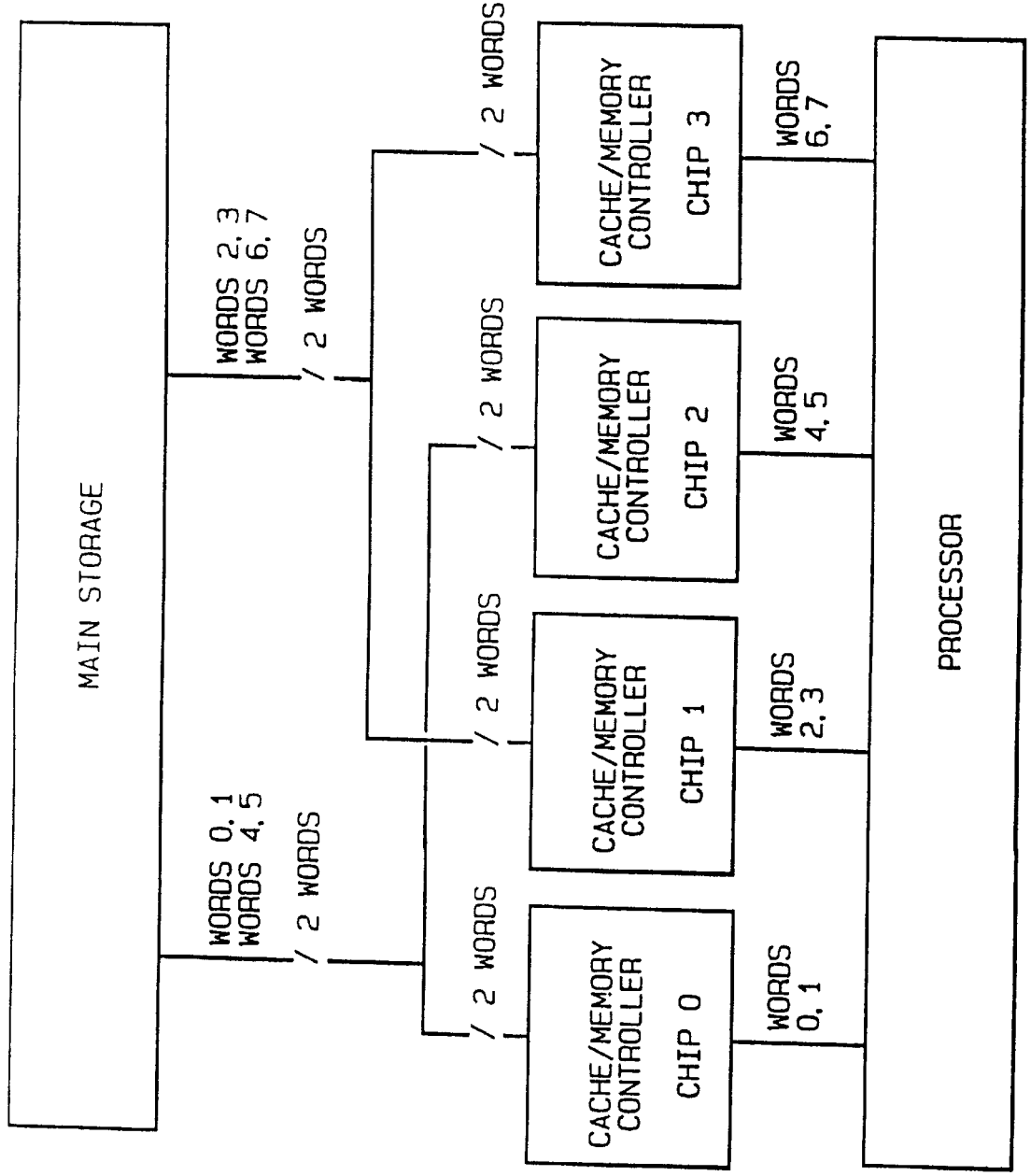
FIG. 6 is a block diagram illustrating a sequential data ordering bus arrangement.

In accordance with features of the invention, the shared bus non-sequential data ordering method and apparatus provides reduced bus loading with multiple chip sources and destinations, improved bus performance, and a reduced I/O count as compared to a sequentially ordered bus arrangement, such as shown in FIG. 6. The reduced I/O count comes from the single word-wide interface to each chip. Data is ordered in the non-sequential method so that the bus unit with the largest number of chips to receive or send data transfers data sequentially in sub transfers to each chip.

Using the ordering method of the invention as illustrated in FIG. 1, each portion of the data bus 18 has only one load per bus unit. The bus units in FIG. 1. are main storage 14 and MSCU 16. The first data sub-transfer includes words 0, 2, 4, 6. On the first sub-transfer, each chip CHIP 0, CHIP 1, CHIP 2, and CHIP 3 gets one word, the even words 0, 2, 4, 6. The second data sub-transfer includes the odd words 1, 3, 5, 7. On the second sub-transfer, each chip CHIP 0, CHIP 1, CHIP 2 and CHIP 3 gets one word, the odd words 1, 3, 5, 7. Using this method, each chip only needs a single word-wide interface. The single word-wide interface is less expensive, results in a smaller package, and leaves more real estate on the chip for other functions.

Figures 2, 3:
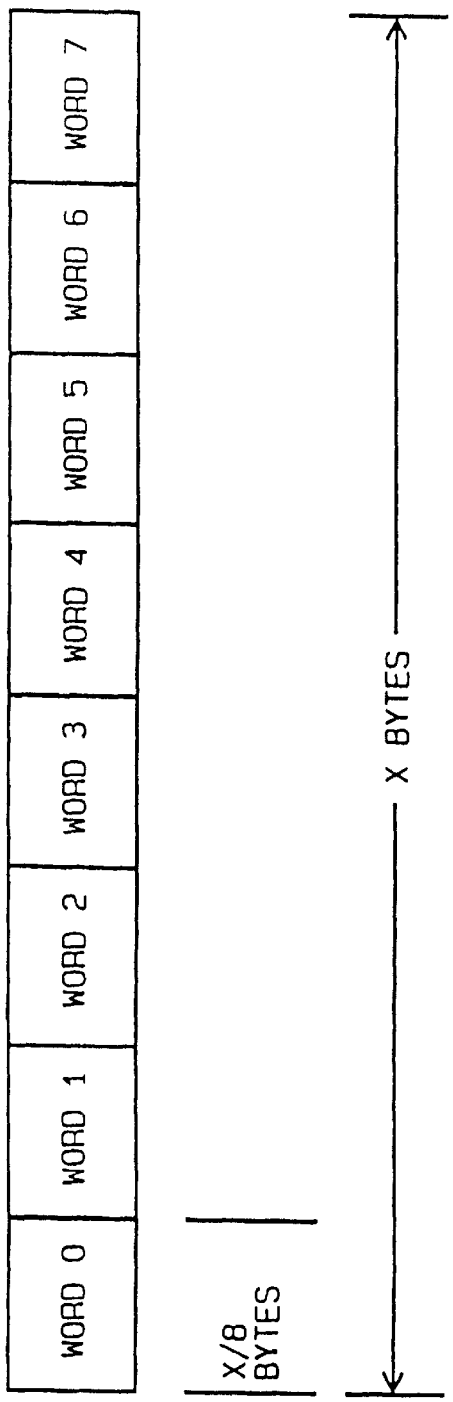
FIG. 2 is a block diagram illustrating a data naming convention of the present invention.
FIG. 3 is a diagram illustrating a data ordering example in accordance with the ordering method and apparatus of the present invention.

FIG. 2 illustrates a data-naming convention, and FIG. 3 illustrates a data-ordering example in accordance with the non-sequential data ordering method and apparatus of the invention. A minimum data transfer width X may be determined by the cache-to-processor interface. With X/2 available I/O pins, a smaller bus Y is represented by X/2 bytes. In FIG. 1 where there are four cache/memory controller chips CHIP 0, CHIP 1, CHIP 2 and CHIP 3, each chip gets X/4 bytes of data. Since the data bus Y is one-half the desired minimum transfer, two sub-transfers (ST) are required to complete a transfer. Let us define the X bytes to be comprised of n words, where a word is the sub-transfer size to each chip. In the example illustrated, n=X/8. For each sub-transfer, each cache/memory controller chip CHIP 0, CHIP 1, CHIP 2, CHIP 3 supplies one-eighth of the total transfer. This is because each chip needs X/4 bytes, but only gets half with each sub-transfer.

For example, as shown in FIG. 1, each receiving unit or CHIP 0, CHIP 1, CHIP 2 and CHIP 3 in the logical receiving MSCU 16 receives data in multiple transfers of the non-sequential ordering. For example, assume the desired data transfer width is X bytes, comprising eight words numbered 0, 1, 2, 3, 4, 5, 6, 7. The X bytes are sent or transferred across the bus in two sub-transfers as words 0, 2, 4, 6 and then words 1, 3, 5, 7.

As a result, each receiving unit CHIP 0, CHIP 1, CHIP 2, CHIP 3 receives data in the standard sequential order. Receiving unit CHIP 0 receives words 0, 1. Receiving unit CHIP 1 receives words 2, 3. Receiving unit CHIP 2 receives words 4, 5. Receiving unit CHIP 3 receives words 6, 7.

Figure 3A:
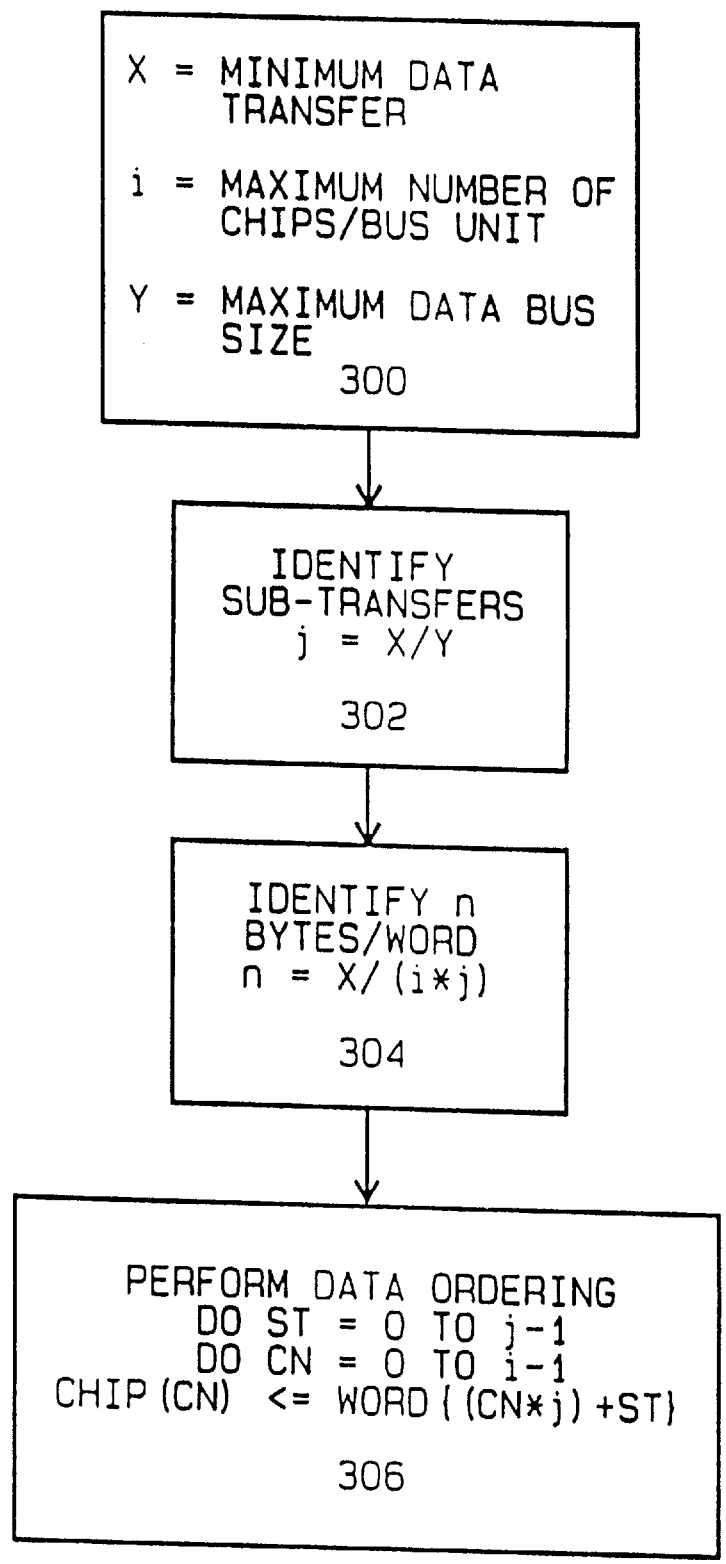
FIG. 3A is a flow chart illustrating sequential steps in accordance with the data ordering method of the present invention.

Referring to FIG. 3A, there is shown a flow chart illustrating sequential steps to determine subtransfer size and data ordering in accordance with the data ordering method of the present invention. The non-sequential ordering method expressed in terms of a mathematical formula follows. First at block 300, let X equal the number of bytes in a minimum data transfer; let i equal the maximum number of chips on a bus unit and let Y equal the maximum size of the data bus, due to I/O constraints.

Next at block 302, a required number of sub-transfers is identified, let j equal the number of sub-transfers required to make a minimum transfer, with j defined as:

j=X/Y, where j is an integer. If Y is not a power of two, then round up to get the integer j.

Next at block 304, an integer value n equal to the number of bytes in a word is identified, with n defined as:

n=X/(i * J), where n is an integer, assuming a power of two.

Next at block 306, a data ordering algorithm is performed as defined by:

```
do ST = 0 to j-1 ;        --for each sub-transfer
   do CN = 0 to i-1 ;     --for each chip
      chip(CN) <= word{(CN * j) + ST} ; --this word
                                          to that chip
   end ;
end;
```

While the do loops at block 306 lock in a particular word to a particular chip per sub-transfer, it should be understood that other data ordering is possible and may be desired. The required I/O pins and loads between bus units are reduced to minimize both the chip input/output (I/O) count and the bus cycle time.

The following Table I lists the data ordering for the example shown in FIG. 1, where j=2 and i=4.

TABLE I

| CN (Chip Number) | | | ST (sub-transfer) | |
|---|---|---|---|---|
| | | | 0 | 1 |
| CHIP | 0 | WORD | 0 | 1 |
| CHIP | 1 | WORD | 2 | 3 |
| CHIP | 2 | WORD | 4 | 5 |
| CHIP | 3 | WORD | 6 | 7 |

FIGS. 4 and 5 provide diagrams illustrating byte numbering for a 16 byte main store bus and for a 32 byte main store bus for a 128 bytes cache line transfer. For the 16 byte bus, Y=X/2 and for the 32 byte bus, Y=X.

Referring to FIG. 6, a sequentially ordered data bus example is shown. Note that each portion of the data bus has two loads per cache/memory controller bus unit. The first sub-transfer includes words 0-3 to chip 0 and chip 1. Chip 0 and chip 1 get two words, words 0, 1 and words 2, 3, respectively. The second sub-transfer includes words 4-7 with words 4, 5 and words 6, 7 to chip 2 and chip 3, respectively. The data bus has two loads for each bus unit that has four chips, which decreases bus performance. In addition, each chip needs a two word-wide interface. If the system has multiple units with four chip interfaces, such as multiple processor and memory cards, the extra loading is significant.

While the invention has been described with reference to details of the illustrated embodiments, these details are not intended to limit the scope of the invention as defined in the appended claims.

What is claimed is:

1. A shared bus non-sequential data ordering method for a data processing system, comprising the steps of:

identifying a maximum bus width value for the data processing system;

identifying a minimum data transfer value; said minimum data transfer value being a predefined number of bytes for the data processing system;

calculating a sub-transfer value utilizing said identified minimum transfer value and said maximum bus width value; said calculated sub-transfer value being represented by i and being equal to a number of required sub-transfers to transfer said minimum data transfer value;

identifying a bus unit having a plurality of chips, each of said plurality of chips to receive or send data for the data processing system; each of said plurality of chips having a word sub-transfer size;

during a data sub-transfer, ordering non-sequential words of said minimum data transfer value, the ordered non-sequential words for each data sub-transfer including either even numbered words or odd numbered words; and transferring a respective one of the ordered non-sequential words to a respective corresponding one of said plurality of chips of said bus unit for each sub-transfer.

2. A shared bus non-sequential data ordering method as recited in claim 1, wherein said steps of identifying a minimum transfer value; identifying a maximum bus width value; and identifying a sub-transfer value responsive to said identified minimum transfer value and said maximum bus width value include the steps of:

identifying said minimum transfer value represented by X bytes, where X bytes comprises n words;

identifying said maximum bus width value represented by Y; where Y is less than X bytes; and identifying said sub-transfer value represented by j=X/Y, where X, Y, and j are integers.

3. A shared bus non-sequential data ordering apparatus for a data processing system, comprising:

means for identifying a minimum data transfer value;

means for identifying a maximum bus width value;

means for calculating a sub-transfer value responsive to said identified minimum transfer value and said maximum bus width value; said calculated sub-transfer value being represented by i and being equal to a number of required sub-transfers to transfer said minimum data transfer value;

means for identifying a bus unit having a plurality of chips, each of said plurality of chips for receiving or sending data: each of said plurality of chips having a word sub-transfer size; and means for ordering non-sequential words of said minimum data transfer value, said ordered non-sequential words for each data sub-transfer including either even numbered words or odd numbered words; and means for transferring a respective one of the ordered non-sequential words to a respective corresponding one of said plurality of chips of said bus unit for each sub-transfer.

4. A shared bus non-sequential data ordering apparatus as recited in claim 3, wherein said sub-transfer value is represented by j=X/Y, where X equals said minimum transfer value in bytes; where X bytes comprises n words; Y equals said maximum bus width value where Y is less than X bytes; and X, Y and j are integers.

5. A shared bus non-sequential data ordering apparatus as recited in claim 4, wherein said predefined word includes n bytes, where n is defined as n=X/(i * j), and n is an integer.

6. A shared bus non-sequential data ordering apparatus as recited in claim 5 wherein said sub-transfer value j=X/Y equals two and wherein said means for ordering non-sequential words of said minimum data transfer value and for transferring the ordered words to each of said bus unit includes means for transferring even words during a first sub-transfer and means for transferring odd words during a second sub-transfer.

* * * * *